United States Patent [19]
Kleve

[11] Patent Number: 5,781,127
[45] Date of Patent: Jul. 14, 1998

[54] KEYBOARD

[76] Inventor: Robert E. Kleve, 1103 24th Ave. S., Grand Forks, N. Dak. 58201

[21] Appl. No.: 682,261

[22] Filed: Jul. 17, 1996

Related U.S. Application Data

[60] Provisional application No. 60/002,787 Aug. 17, 1995, and provisional application No. 60/016,995 Apr.30, 1996.

[51] Int. Cl.$^6$ ...................................................... G01C 9/00
[52] U.S. Cl. .............................. 341/22; 341/20; 200/5 R; 400/489
[58] Field of Search ............................. 341/22, 20, 23; 200/5 R; 400/100, 486, 489, 475, 479, 479.2; 434/112, 227

[56] References Cited

U.S. PATENT DOCUMENTS

| | | | |
|---|---|---|---|
| 4,265,557 | 5/1981 | Runge | 400/479 |
| 4,414,537 | 11/1983 | Grimes | 434/112 |
| 4,442,506 | 4/1984 | Endfield | 364/900 |
| 4,517,424 | 5/1985 | Kroczynski | 200/5 R |
| 4,849,732 | 7/1989 | Dolenl | 400/100 |
| 4,897,649 | 1/1990 | Stocki | 400/489 |
| 4,913,573 | 4/1990 | Retter | 400/489 |
| 4,917,516 | 4/1990 | Retter | 400/489 |
| 5,151,553 | 9/1992 | Suzuki | 341/20 |
| 5,178,477 | 1/1993 | Gambaro | 400/489 |
| 5,212,372 | 5/1993 | Quzck | 341/20 |
| 5,281,966 | 1/1994 | Walsh | 341/22 |
| 5,361,083 | 11/1994 | Pollack | 341/20 |
| 5,481,263 | 1/1996 | Choi | 341/20 |
| 5,552,782 | 9/1996 | Horn | 341/22 |
| 5,581,484 | 12/1996 | Prince | 364/559 |

Primary Examiner—Jeffery Hofsass
Assistant Examiner—Albert K. Wong
Attorney, Agent, or Firm—Robert E. Kleve

[57] ABSTRACT

The invention comprises a finger actuated one handed keyboard having a palm rest portion for the palm of the operator's hand to rest upon, and at least three finger actuated sleeve receptacle assemblies. Each assembly has an outer lateral extending sleeve pivotally connected to a longitudinally extending inner half sleeve aligned for receiving the outer and inner portions, respectively of a finger; and a plurality of finger actuated key members with at least two key members aligned in front and behind the lateral outer sleeve and confronting the pivotal path of longitudinal movement of the lateral outer sleeve in either direction and adapted, upon longitudinal movement in either direction by the outer finger portion about the middle joint in either direction, to actuate either confronting key. Each sleeve receptacle assembly has a third one of the plurality of key members mounted below the pivotal longitudinal extending half sleeve to be actuated by the inner portion of the finger pivoting downward about its inner pivot against the half sleeve to pivot the half sleeve laterally downward against the third key member to actuate the third key member, separate from the actuation of the two key members by the outer sleeve, and with the outer two key members being actuatable by the longitudinal movement of the outer sleeve when the inner half sleeve is in either is upper or pivotal downward position, separate from the actuation of the third one key member. The keyboard also has a thumb receptacle movable by the thumb of of the operators hand to actuate a plurality of key members, while the fingers of the hand operate the finger sleeve assemblies to actuate the finger key members.

18 Claims, 6 Drawing Sheets

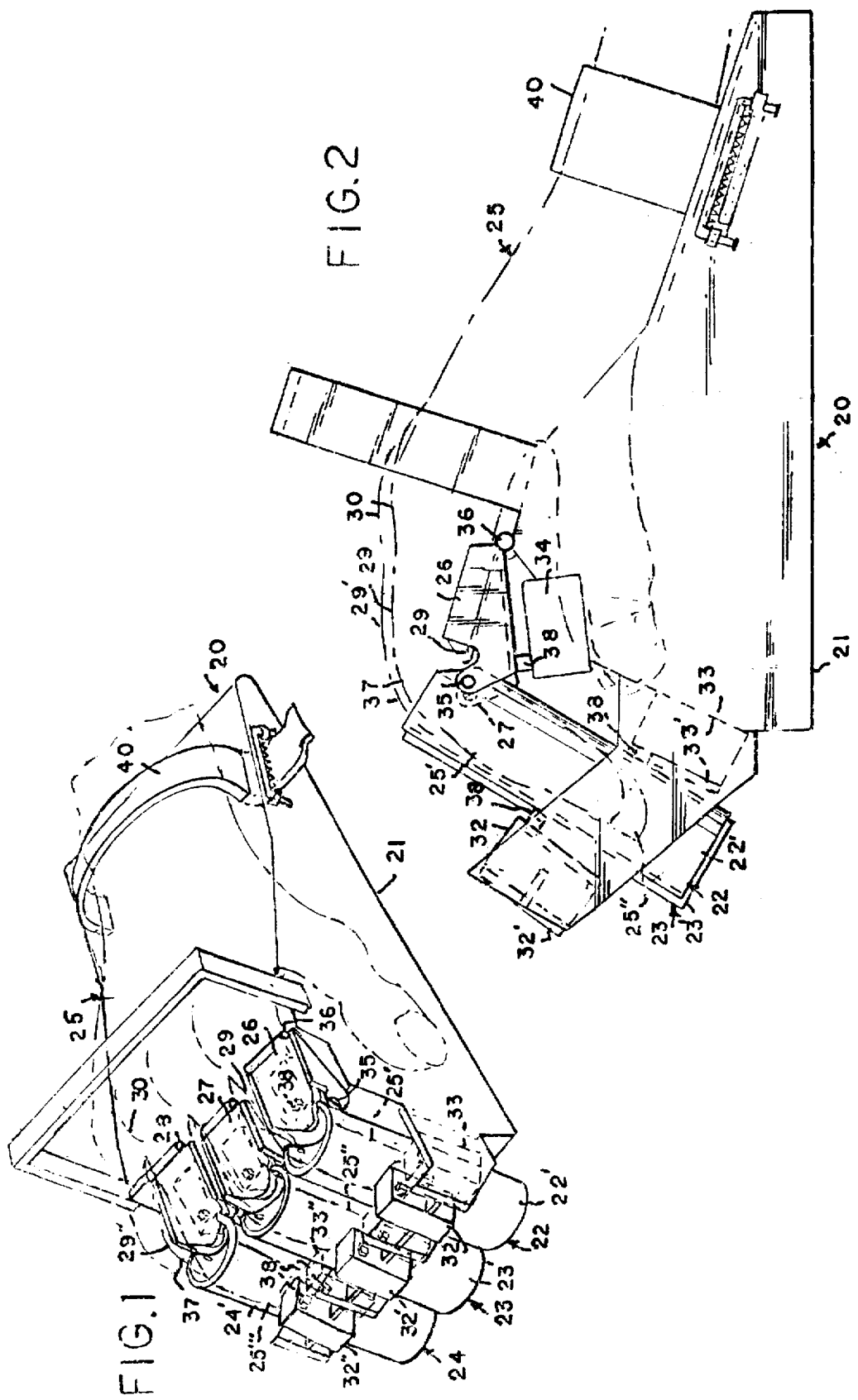

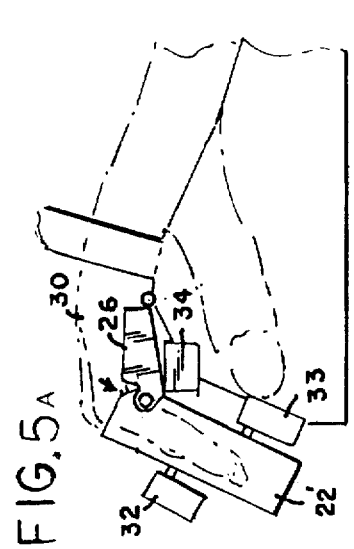
FIG. 4A
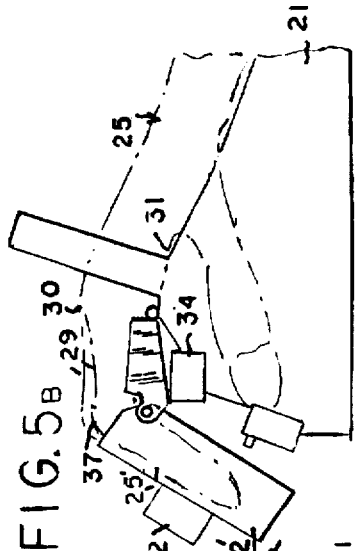
FIG. 4B
FIG. 4C
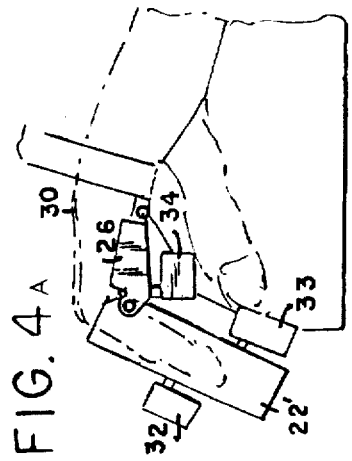
FIG. 5A
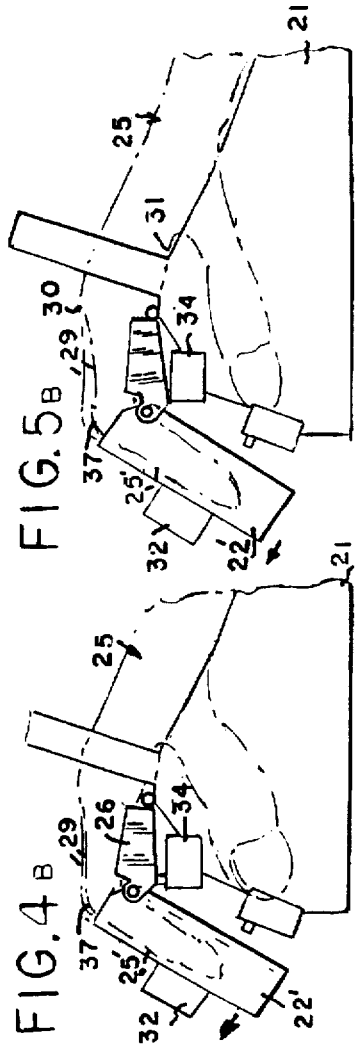
FIG. 5B
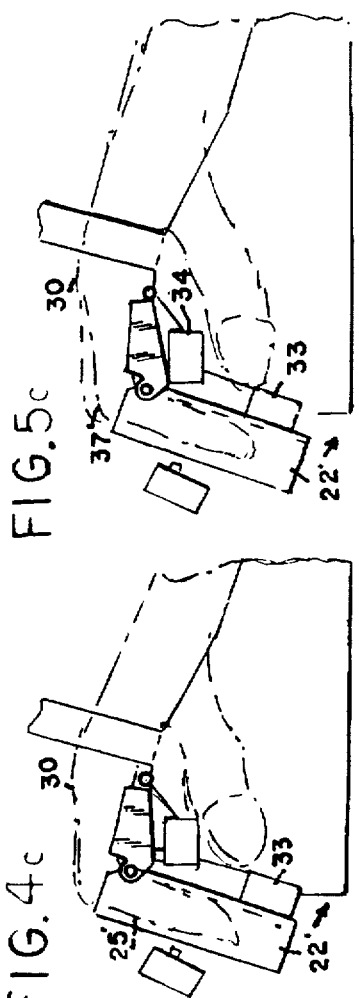
FIG. 5C

KEYBOARD

BACKGROUND OF THE INVENTION

This invention relates to keyboards and the like.

The subject matter of my earlier U.S. Provisional patent application, Ser. No. 60/002,787: Title: Keyboard; Filed: Aug. 17, 1995 is essentially the same as the subject matter described in the earlier part of this application. FIGS. 1–5, inclusive, of the earlier provisional application are essentially the same as FIGS. 1–5, incl., of this application. The finger operated keyboard with the three finger sleeves 22, 23, and 24 which are operated by the fingers 25, 25', and 25" of the operator's hand, as described in the first part of this application are essentially the same as shown and described in this earlier provisional application. The priority benefits of the earlier filing date of this earlier provisional application are being claimed as to the subject matter it has in common with the subject matter disclosed as a part of this application.

The subject matter of my second earlier U.S. Provisional patent application, Ser. No. 60/016,995; Title: Keyboard Having Finger Key and Thumb Key Assembly: Filed: Apr. 30, 1996; is also essentially the same as the subject matter described in the latter part of this application. FIGS. 6–9, inclusive, of this second provisonal application are essentially the same as FIGS. 6–9, incl., of this application. The priority benefits of the earlier filing date of this second earlier provisional application are also being claimed as to the subject matter it has in common with that disclosed as a part of this application.

It is an object of the invention to provide a novel finger operated keyboard which can be operated with a minimum of finger movement.

It is a further object of the invention to provide a novel finger operated receptacle keyboard which has receptacles to receive the finger therein with keys which can be operated by the movement of the receptacles, by the fingers moving the receptacles with essentially the only movement of the fingers being pivotal movement about the finger joints.

It is another object of the invention to provide a novel finger receptacle operated keyboard, which can be operated with finger movement and which enables the actuation of keys by the pivotal movement of the fingers moving in either direction moving the receptacles in either direction to actuate the keys in either direction.

It is another object of the invention to provide a novel keyboard which has finger receiving receptacles which receptacles can be operated by finger movement therein to engage keys by the finger movement for entering or registering indicia into a receiving medium, such as for typing, and which utilizes only three fingers of one hand for the main key actuation in the operation.

It is a further object of the invention to provide a novel thumb receiving receptacle for movement by the thumb for actuation of keys.

Further objects and advantages of the invention will become apparent as the description proceeds and when taken in conjunction with the accompanying drawings wherein:

BRIEF DESCRIPTION OF THE DRAWINGS

FIG. 1 is a perspective view of the one handed three finger receptacle keyboard.

FIG. 2 is a side elevational view of the one handed three finger receptacle keyboard.

FIG. 4A is a side view of the one handed finger actuated keyboard invention, illustrating one of the sleeve assemblies in an upper neutral position with no keys actuated.

FIG. 4B is a side view of the keyboard invention illustrating one of the sleeve assemblies in an upper position and pivoted forward by one of the three fingers pivoted forward about its middle joint to activate the forward outer key for registering a signal.

FIG. 4C is a side view of the keyboard invention illustrating one of the sleeve assemblies in an upper position and pivoted rearward about its pivotal connection to the inner half sleeve by gone of the three fingers pivoted rearward about its middle joint to activate the rearward outer key to register a signal.

FIG. 5A is a side view of the one handed finger actuated keyboard invention, illustrating one of the sleeve assemblies in a lower position activating one of the inner keys. However, activating only one inner key does not activate or register a signal; as the inner key must be activated with an outer key or another inner key to register a signal.

FIG. 5B is a side view of the keyboard invention, illustrating one of the sleeve assemblies in a lower position activating one of the inner keys, by pivoting the inner portion of the finger down about its inner joint, and also pivoting the sleeve forward to activate a forward outer key, together with an inner key, to register or activate a separate signal.

FIG. 5C is a side view of the keyboard invention, illustrating one of the sleeve assemblies in a lower position, pivoting a inner half sleeve to a lower position, by pivoting the inner portion of the finger down about its inner joint, to activate an inner key, and also pivoting the sleeve rearward about its pivotal connection to the inner half sleeve to activate a rearward outer key, together with an inner key, to register or activate a separate signal.

Figure 3:
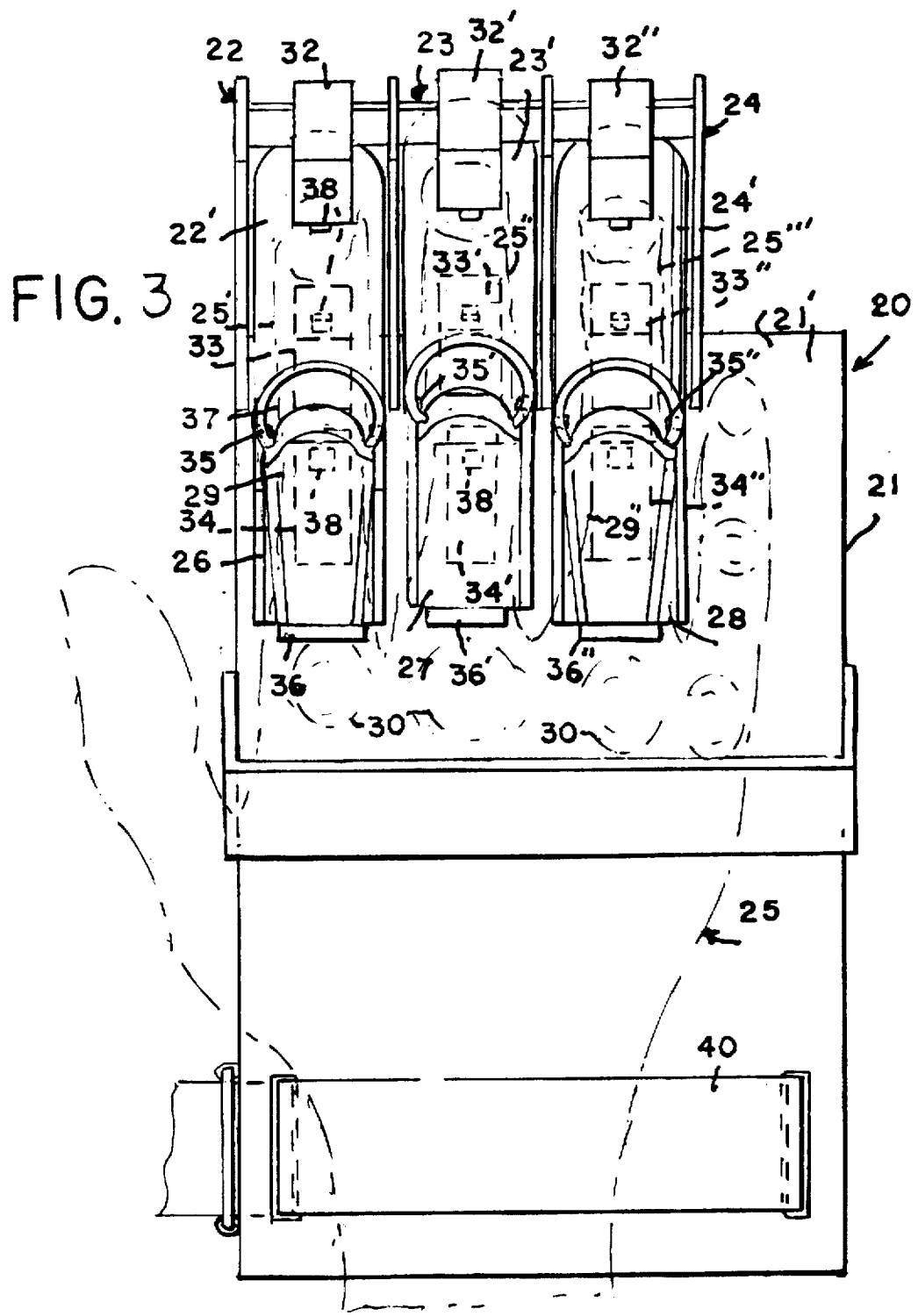
FIG. 3 is a top view of the one handed three finger receiving receptacle operated keyboard.
Figure 6:
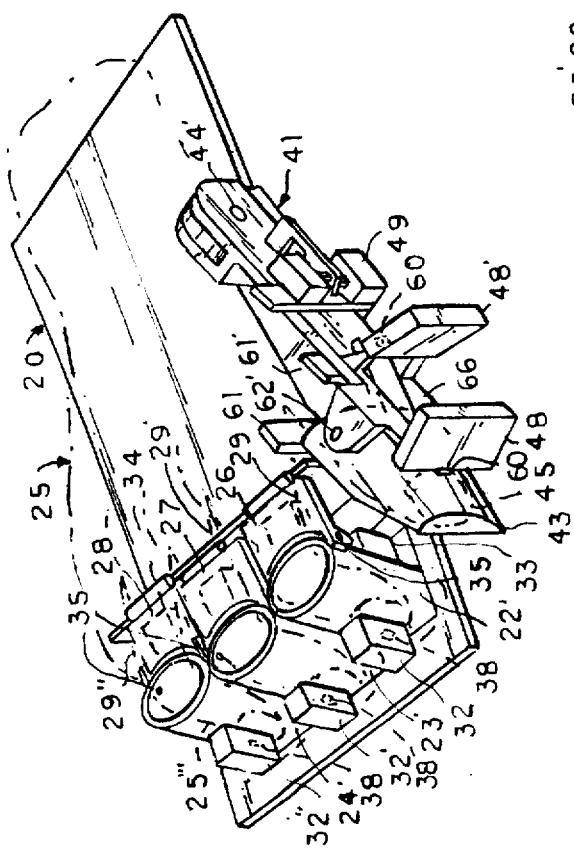
FIG. 6 is a perspective view of the finger and thumb keyboard.
Figure 7:
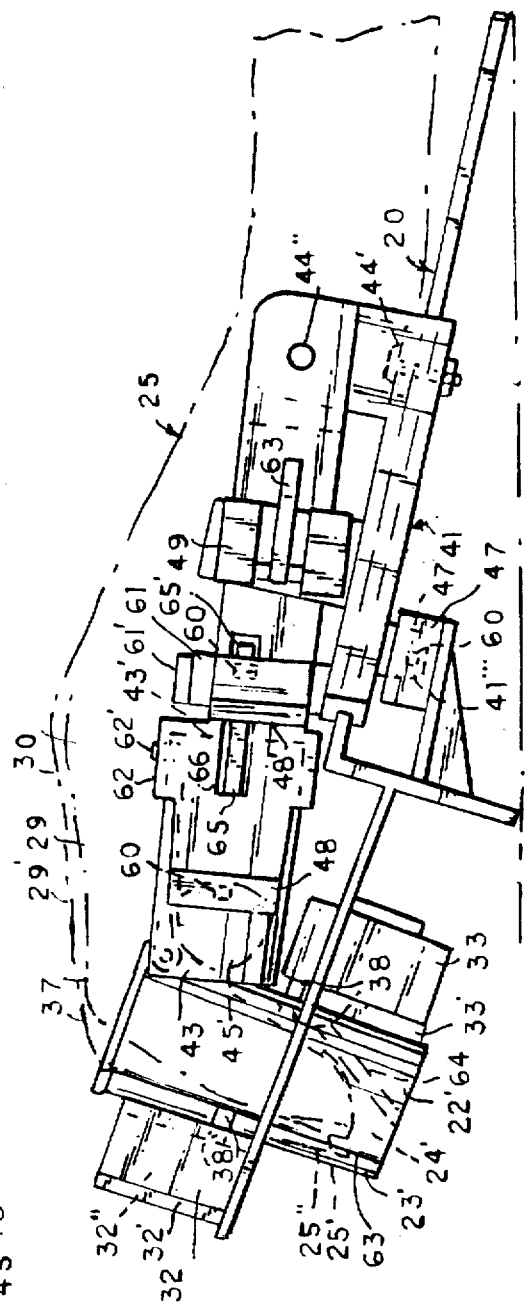
FIG. 7 is a side elevational view of the finger and thumb keyboard.

The invention, in its preferred form, is as shown in FIGS. 6–9, inclusive, which includes the three finger sleeve key actuation assembly as well, as the thumb receptacle key actuation assembly.

BRIEF DESCRIPTION OF PREFERRED EMBODIMENT

Briefly stated, the invention comprises a finger actuated one handed keyboard having a palm rest portion and at least three L shaped elongated finger actuated assemblies extending in a forwardly direction from the front of the palm rest. Each assembly has a partial inner sleeve extending longitudinally forward from the palm rest and a lateral outer sleeve extending laterally downward from the forward outer end of the inner sleeve so that the palm of the operator's hand may rest on the palm rest while the inner and outer portions of the operator's three fingers are received in the inner and outer threes sleeves of the device The inner partial sleeves are pivotally mounted to the palm rest and the lateral outer sleeves are pivotally mounted to the forward outer ends of the inner sleeves. At least two key members confront the front and rear of each lateral outer sleeve and a key member is mounted below each inner sleeve, so that the inner half sleeve may actuate the key below by the operator pivoting the inner portion of his fingers downward against the half sleeves to pivot the half sleeves down against the key member to actuate it, and the lateral sleeves may actuate either outer front or rear key of each outer sleeve by the operator pivoting his outer finger portion either forward or rearward to pivot the lateral sleeve either forward or rearward againt either key to actuate it.

A thumb key assembly is pivotally mounted to the palm rest member and has a pivotally mounted thumb arm with a pivotal thumb sleeve thereon receiving the thumb of the operator's hand and operating the assembly.

Referring more particularly to the drawings, in FIGS. 1–9, the one handed finger actuated keyboard 20 is illustrated having a palm rest member 21 and three elongated finger actuated sleeve assemblies 22, 23, and 24, each extending forward from the rest member 21 with the assemblies in parallel spaced relation to one another. Each assembly has a longitudinal forward extending partial inner sleeve 26, 27, and 28 and pivotally mounted at its rearward end 36, 36', and 36" to the forward end of the palm rest 21, and a laterally extending outer sleeve 22', 23', and 24' pivotally mounted to the forward outer ends of the inner partial sleeves at pivots 35, 35', and 35" and extend laterally downward therefrom In FIGS. 6–9, incl., the finger actuated sleeve assemblies 22, 23, and 24 and thumb key assembly 40 are mounted together on rest member 21

Finger Sleeves:

The forward extending partial inner sleeves 26, 27, and 28 and their lateral downward extending outer sleeves 22', 23', and 24' receive, as receptacles, rearward inner portions 29, 29', and 29" and the forward outer portions 25', 25", and 25''' of the three middle fingers of an operator's hand 25, with the palm 30 of the operator's hand resting an the palm rest member 21.

Each of the three finger receiving sleeve or socket assemblies 22, 23, and 24 have three actuatable key members 32, 33, and 34, 32', 33', and 34', and 32", 33", and 34", which are mounted on the frame 40 fixed to the forward end 21' of the palm rest 21. Two of the key members 32 and 33, 32' and 33', 32" and 33" of each assembly are aligned longitudinally in front of and behind or rearward of, or on opposite confronting sides of each lateral extending outer sleeve 22', 23', and 24' in the path of the outer sleeve's pivotal movement in either direction about their pivotal mountings 35', 35", and 35''' to their inner longitudinal forward extending partial sleeve 26, 27, and 28, respectively.

The forward or longitudinal extending inner partial sleeves 26, 27, and 28 have their rearward end pivotally mounted at pivots 36', 36", and 36''' to the forward end 21' of the palm rest 21, and the third key member 34, 34', and 34" for each assembly is mounted below the forward extending inner sleeve 26, 27, and 28, respectively, so that the operator's pivoting of the rearward lower inner portions 29, 29', and 29" of his fingers of his hand 25, downward, about the inner three inner knuckle joints 30 of his fingers to his palm 31 will push and pivot the inner half sleeves 26, 27, and 28 laterally downward about their pivotal mountings to the palm rest, against the keys 38 of the key members 34, 34', and 34" to activate the third key members. The pivotal mounting 36', 36", and 36''' are of the inner half sleeves to the palm rest 21 are positioned so as to be conveniently adjacent the three inner knuckle joints 30 of the operator's hand The lateral downward outer sleeves each have their pivotal mountings 35, 35', and 35" at their upper ends to the inner half sleeves 26, 27, and 28, respectively, positioned so as to be adjacent the middle joints 37 of each of the three fingers 25', respectively, of the operators's hand. Consequently, when the outer ends of the fingers when bent laterally and received in the lateral outer sleeves and the inner portions rest on their half sleeves, as shown in FIG. 2, the pivotal movement of the outer portions of the fingers about their middle joints 37 against the outer sleeves wil conveniently pivot the outer sleeves 22', 23' and 24' of the device about their pivots 35, 35', and 35" in either a forward or rearward direction, depending upon which direction the fingers are pivoted about their middle joints against the outer sleeves to pivot them.

The structure of the lateral downward outer sleeves and their operation thereby enables the forward outer portions of the fingers to activate the upper key members 32, 32', and 32" by the operator pivoting the outer portions of his fingers, when extending laterally downward into the outer sleeves, forward and upward about their middle joints 37; against the outer sleeves, pivoting them forward and upward about their pivotal connections 35, 35', and 35" to the inner sleeves, against the keys 38 of the upper key members 32, 32', and 32" to activate them.

Conversely, the structure of the lateral downward outer sleeve and its operation enables the outer portions of the operator's fingers, when bent laterally down at their middle joints 37 and received in the lateral outer sleeves, to activate the lower keys 38 of the lower outer key members 33, 33', and 33", by pivoting the outer portions of his fingers rearward about the middle joints 37 against the lateral sleeves, thereby pivoting the lateral sleeves about their pivotal mountings 35, 35', and 35" to the inner sleeves, rearward against the keys 38 of the rear outer key members 33, 33', and 33" to activate them The key members 32, 33, 32', 33', 32", and 33" are conventional micro switches each having a movable lug or key 38 spring loaded to extend outward from the switch housing and which, upon the outer sleeves 22', 23', and 24' physically engaging them, depresses the lug or key into the switch housing, closing the bridging circuit to activate them. The inner key members 34, 34', and 34" have a similar lug or key 38 which the inner half sleeves to depress them into the housing to activate them.

The positioning of the inner and outer sleeve's pivots adjacent the inner and middle finger joints is facilitates the inner finger portions of the operator's fingers, between the knuckle joints 30 and middle joints 37 to conveniently pivot the half sleeves 26, 27, and 28 downward by the operator pivoting his inner finger portions of his hand downward to activate the key members 34–34" below in a separate largely independent movement with respect to the outer portions of the operator's fingers and their movement; and it facilitates the lateral outer, sleeves being pivoted by the outer portions of the fingers largely independent of the inner sleeves and inner portions of the fingers.

When the short inner half sleeves 26, 27, and 28 of the sleeve assemblies 22, 23, and 24 are pivoted laterally downward by the operator inner finger portions; the lateral pivoting movement of the inner sleeves pushes the lateral outer sleeves generally axially and laterally downward, as they are pivotally connected to the inner half sleeves. This causes the outer sleeves to slide along their center axes in a generally axial direction, sliding between their respective pair of outer confronting key members 32, 33, 32', 33', 32", and 33", from their upper position shown in FIG. 4(A) to their lower position shown in FIG. 5(A). The three outer sleeves will slide freely between their respective pair of outer key members, without the sleeves activating their outer key members. This is because the pivoting of the short inner half sleeves 26, 27, and 28, in pivoting laterally about their pivotal axes to the palm rest member 21 move mainly laterally at that point causes the lateral extending outer sleeves to slide mainly laterally and freely from their upper to their lower position, with essentially no effective longitudinal side movement, and none sufficient to compress the keys of the outer key members.

Also, by having the pair of confronting outer key members for the outer sleeves mounted fixed to the front of the palm rest frame 21 and allowing the outer sleeves to slide axially between their confronting keys without activating them, when thir respective inner sleeve is pivoted downward; it enables the short inner half sleeves to thereby activate their respective inner keys without activating the outer confronting keys and visa versa enables the confronting keys to be activated without activating the inner keys, if desired.

Further, by the outer sleeves sliding axially laterally when the inner half sleeves are pivoted down, it enables the outer sleeves to adjust the the change in position of the inner half sleeves, to which they are pivotally attached, and still enables the outer sleeves to activate either desired outer confronting key member, when they and their respective inner half sleeve are in either their laterall upper or lateral lower positions. This is because the outer sleeves can be pivoted about their pivotal mountings to the inner sleeve to activate the desired outer key member, in either position of the members, as shown in FIGS. 4B and 4C, for activating the front and rear outer key members, respectively, when the sleeve is in its upper position, and for activating the front and rear outer key members when the sleeve is in its lower position, and has also activated one of the inner key member as shown in FIGS. 5(B) and 5(C).

The structure of the three sleeve assemblies 22, 23, and 24 is essentially the same, each functioning the same, with the pivots serving the same function. The operative position of the sleeve assemblies 22 and 24 is staggered back slightly from the operative position of assembly 23, rearward toward the palm rest 21 in their mounting to the palm rest 21. This is to correspond to the staggered similar positions of the first and third fingers of a human hand, relative to the middle finger. This enables the fingers to be more easily received and operated in and to operate the sleeve assemblies 22, 23, and 24, as the first or forefinger 25' is received in sleeve assembly 22, the middle finger 25" received in sleeve assembly 23, and the third finger 25'" received in sleeve assembly 24, as shown in FIG. 1.

Key Operation

The finger actuated keyboard invention 20 has only three finger actuated sleeve receptacle assemblies 22, 23, and 24 utilized, described and illustrated for the operation of the keyboard. These three assemblies serve to receive the three middle fingers of the one hand of the operator. An additional fourth finger sleeve assembly may be added to the device for operation by the fourth or little finger of the operator's hand, if the keyboard is to provide additional functions. Also, the thumb may be provided with a separate thumb actuated key assembly, if desired.

Each of the three sleeve assemblies have three switches for a total of nine switches, two outer confronting switches and one inner switches or key members, which can provide the 26 different key positions necessary for typing all 26 letters of the alphabet, for example.

When it is desired to operate the finger actuated keyboard 20, the operator will insert his three middle fingers, the forefinger 25', the middle finger 25", and the third finger 25'" into the sleeves 22, 23, and 24, respectively, as illustrated in FIGS. 1-3, inclusive, with the outer portions of the fingers 25', 25", and 25'" in the outer sleeves 22', 23', and 24' and bent or pivoted laterally at their middle joints 37, and with the inner portions 29, 29', and 29" of the fingers extending longitudinally along the top of the inner half sleeves 26, 27, and 28 and resting on the inner half sleeves. The middle joints 37 of the fingers will be adjacent the pivotal connections 35, 35', and 35" between the upper ends of the outer sleeves 22', 23', and 24' and the inner half sleeves 26, 27, and 28. The inner joints 37 of the fingers (the knuckles) will be adjacent the pivotal connections 36', 36", and 36"' to the palm rest, as shown in FIGS. 1–3, inclusive.

The sleeve assemblies are shown in their neutral position in FIGS. 1–3, and 4(a). The spring returns for the keys 38 of the key members will be sufficiently strong to hold the outer sleeves in a neutral position between the outer confronting keys; and the spring returns for the inner keys 38 will be sufficient to hold the inner half sleeves in their upper position, as well as the outer sleeves in their upper position as shown in solid lines in FIG. 2 and 3, when the fingers are resting in their operative positions in the sleeve assemblies.

In order to activate any key, the outer sleeves 22', 23', and 24' must be pivoted, either up or down, about its pivots 35–35" from neutral by the operator pivoting the outer portions 25', 25", and 25'" of his fingers, either up or down, about their middle joints 37. Since the outer portions of fingers when inserted into the outer sleeves must be bent or pivoted laterally about their middle joints, the outer portions of the fingers may be pivoted either forward or rearward once in the outer sleeves, when the outer sleeves are in neutral. Pivoting any outer sleeve 22', 23', or 24' clockwise upward, when viewed from FIGS. 1 or 2, will activate one of the upper outer keys 32, 32', or 32", depending upon which outer sleeve is pivoted by the outer portions of the fingers.

An outer sleeve 22' is illustrated in FIG. 4(B) having moved forward and upward about its pivots 35–35" from its neutral position, as shown in FIG. 4(A), and having engaged, depressed key 38, thereby activating key member 32. Sleeves 23' and 24' activate key members 32' and 32", similarly, depressing their keys 38. The sleeves need only be pivoted a short distance upward by pivoting the outer portions of the fingers forward about the middle joint to engage and activate the keys with the outer sleeves.

Pivoting any outer sleeve 22', 23', or 24' counterclockwise, downward and rearward, from neutral position, by pivoting the outer portions of any one of the three fingers rearward and counterclockwise about their middle joints 37, when viewed from FIGS. 1 and 2, conversely, will actuate one of the lower reaward outer key members 33, 33', or 33", depending upon which outer sleeve is pivoted downward and rearward, by the outer sleeve engaging one of the keys 38 of the rear outer key members and depressing the key to activate the member. The outer sleeves need only be pivoted a short distance downward and rearward, from their neutral position shown in FIG. 4(A) to their activated position shown in FIG. 4(C) by the movement of the outer portions of the fingers a short distance downard and rearward about their middle joints to accomplish the activation.

This movement of the outer sleeves, alone, in either direction forward or rearward enables six differemt key positions to be attained by activating any one of the six outer key members, without activating any inner key member.

By the operator activating one inner key member 34, by pressing or pivoting the inner portion 29 of his finger downward about the inner joint 30, thereby pressing or pivoting the inner half sleeve 26 downward about its pivot 35 against key 38 depressing key 38 and activating key member 34, as shown in FIG. 5(A); and then immediately thereafter, while maintaining and holding the inner half sleeve 26 downward with the inner portion 29 of his first finger 25' to maintain key 38 of the key member 34 depressed to maintain activation of key 34, the operator may then activate any one of the same six outer key members, by pivoting one of the outer sleeves forward to activate one of the forward outer key members by the sleeve depressing its key and by the operator pivoting the outer portion of his finger in that sleeve forward about its middle joint as already described to its position as shown for example in FIG. 5(B), or rearward to activate the rear outer key members by pivoting the rear outer sleeve rearward about its pivots 35–35', by the operator pivoting the outer portions of his finger rearward about its middle joint, as in FIG. 5(C). This includes portions of forefinger 25' rearward about its middle joint while holding key 34 activated by the inner portion 29 of that same finger 25'. This enables a second set of six different key positions to be attained.

By the operator activating the second or middle inner key member 34', by pivoting the inner portion 29' of his middle finger 25" downward about the inner joint 30', pushing or pivoting the second inner half sleeve 27 downward against the key 38 of the inner key member 34'; and then immediately thereafter, while holding and maintaining the inner middle key 38 of the middle key member downward with the inner portion of his middle finger, activating any one of the same six outer key members by pivoting the outer portions of one of his three fingers either forward or rearward about the middle joint 37, including if desired the outer portion of the middle finger, to thereby pivot the outer sleeve of that finger about its pivots 35–35" either forward or rearward to activate the appropriate outer key member, a third set of six different key positions is provided.

Further, by the operator activating the third inner key member 34", by pivoting the inner portions 29" of his third finger 25" downward about the inner joint 30, pushing or pivoting the third inner half sleeve 28 downward against the key 38 of the inner key member 34"; and then immediately thereafter, while holding and maintaining the third inner key 38 of the third inner key member 34' downward with the inner portions of his third finger, activating one of the same six outer key members by pivoting the outer portions of one of his three fingers either forward or rearward about the middle joint, including, if desired the outer portion of the third finger, to thereby pivot the appropriate one of the three outer sleeves about their pivots 35–35" either forward or rearward against the key 38 of the appropratie outer key member to to depress the key intot the key member to activate that key member, a fourth set of six different key positions is provided for a total of 24 different key positions.

Two additional key positions can be provided by using only the inner keys. The first and second inner keys 38 of the first and second inner key members 34 and 34' may be pressed down together by the operator pivoting the inner half sleeves 26 and 27 down together, by pivoting the inner portions of his first and second fingers 25', 25" down together or in close sequence for activating the twenty fifth position. The second and third inner keys 38 of the second and third inner key members 34' and 34" may be pressed down together, by the operator pivoting the inner half sleeves 27 and 28 down together, by pivoting the inner portions of his middle and third fingers 25" and 25"' downward together or in close sequence, thereby providing twenty-six different key positions, sufficient for typing the alphabet.

The finger movement for activating the outer keys and inner keys can accomplish the key actuation of all keys without any wrist or arm movement, as the fingers only need to be pivoted about their middle or inner joints, relative to the palm of the operator's hand, which can remain stationary, as well as the arm.

The springs returns of the keys 38 of the key members for the inner half sleeves and outer sleeves are strong enough to return the outer sleeves to their neutral position, and the inner half sleeves to the upper unpressed position along with moving the outer sleeves to their upper position, when the sleeves are not held out of neutral or pressed downward by the operator's movement of his fingers. The lower outer keys and the inner keys may have stronger springs than the upper outer keys if desired.

Separate additional springs may also be provided and other styles and types of switches may be provided, including such things as light activated, pressure sensitive, or moisture sensitive switches and etc., and used in place of the key switches shown, and the specific sleeve construction may vary to provide a frame structure that parallels the fingers and moves similar to the fingers to follow the finger movement and trigger the switches.

A strap 40 may be mounted to the rear of the palm rest to extend over the top of the wrist of the operator's hand 25 and secure the wrist to the palm rest in a fixed position, as well as secure the palm of the operator's hand to the palm rest, to facilitate the operator moving his fingers and the sleeve assemblies relative to the palm of his hand and his wrist, as essentially no wrist and palm movement is necessary to operate the sleeve assemblies, only finger movement relative to the finger joints being necessary.

The outer sleeves 22', 23', and 24' for the outer portions of the fingers are positioned laterally as to the inner half sleeves or panels 26, 27, and 28m so that the fingers will be bent slightly as shown about their joints 37, when the fingers are operatively positioned in the sleeves 22', 23', and 24' as shown. This is so the tips of the fingers may pivot back and forth as shown toward their mmore straight position and back with a neutral position between, and thereby be able to move in both directions to actuate switches in their path in both directions.

Also, the rear half sleeves 26, 27, and 28 are shown as flat panels in FIGS. 6–9, whereas they are curved slightly in FIGS. 1–5 to more closely surround the inner rear finger portions, they nevertheless operate in the same fashion, in either form.

Thus, it will be seen that a novel finger socket keyboard has been provided which can be operated by receiving the fingers of an operator's hand in the sockets, with the sockets being movable in response to the operator's movement of his fingers, with switches mounted in the path of the socket movement in both directions of socket movement about a pivotal axis to be actuated by the socket movement when moving the fingers in either direction.

For the full operation of the keyboard 20, the thumb end 45' of the thumb 45 of the operator's hand will be inserted into the receptacle 40 for operation of the thumb assembly with the thumb of the operator's hand, as shown in FIGS. 6–9; while the same one operator's hand will operate the three finger assemblies 22, 23, and 24 with his three fingers as already described in FIGS. 1–5 and as shown in FIGS. 1–9 inclusive.

Thumb Key Assembly:

The thumb key assembly 40, FIGS. 6–9, is operated entirely by the thumb of the operator's hand. The thumb key assembly 40 has a main plate 41 pivotally mounted to the palm rest member 21 of the keyboard 20, with a thumb arm 42 pivotally mounted to the main plate 41 and a thumb sleeve 43 pivotally mounted to the thum arm 42. The main plate 41 is pivotally mounted to the palm rest member 21 of the finger key assembly or keyboard 20 by a vertical pivot connection 44' to the palm rest 21 at the rear of the main plate 41. The vertical pivot 44' is part of a generally universal joint 44 of the thumb assembly, at the rear of the main plate. The universal joint also has a horizontal pivot 44" for the rear 42" of the thumb arm to pivot upon relative to the main plate about a horizontal aixs, by the operator pivoting the tip 45' of his thumb 45, resting in the thumb sleeve 43 pivoting the thumb sleeve and thumb arm, upward and downward about the rear joint 46" of this thumb 45, while the rear of his thumb 45", adjacent the rear joint 46"' of the thumb, rests upon the main plate 41 of the thumb assembly 40.

The thumb key assembly 40 has at least six switches 47, 47', 48, 48', 49, and 49' which are operated by the thumb. Two of the switches 47, 47' are mounted on the palm rest 21 and provide a horizontal right and left switches for the rear main portion 45" of the thumb 45 to trigger and operate by the operator pivoting his thumb left and right about the rear joint 46"' of the the thumb to pivot the rear main plate 41 horizontally relative to the palm rest 21 left and right.

The rear main plate 41 of the thumb key assembly has two fixed, upright flanges 61 and 61', which are fixed to the main plate and extend upward from the main plate. The rear main portion of the thumb, between the front joint 46' of the thumb and the second front joint 46" of the thumb is slidably engaged between the two flanges, as shown in FIG. 14. By moving this rear main portion 45" either horizontally left or right about its rear joint 46"' of the thumb, it pivots the rear main plate 41 horizontally, relative to the palm rest, about the pivot 44". The main plate 41 has a depending flange 41"' which moves with the main plate and engages actuation button 60 of either switch 47 or 47' to actuate either switch 47 or 47', by the rear main portion of the thumb engaging against either upright flange 61 or 61' to provide the movement, horizontally.

Figure 8:
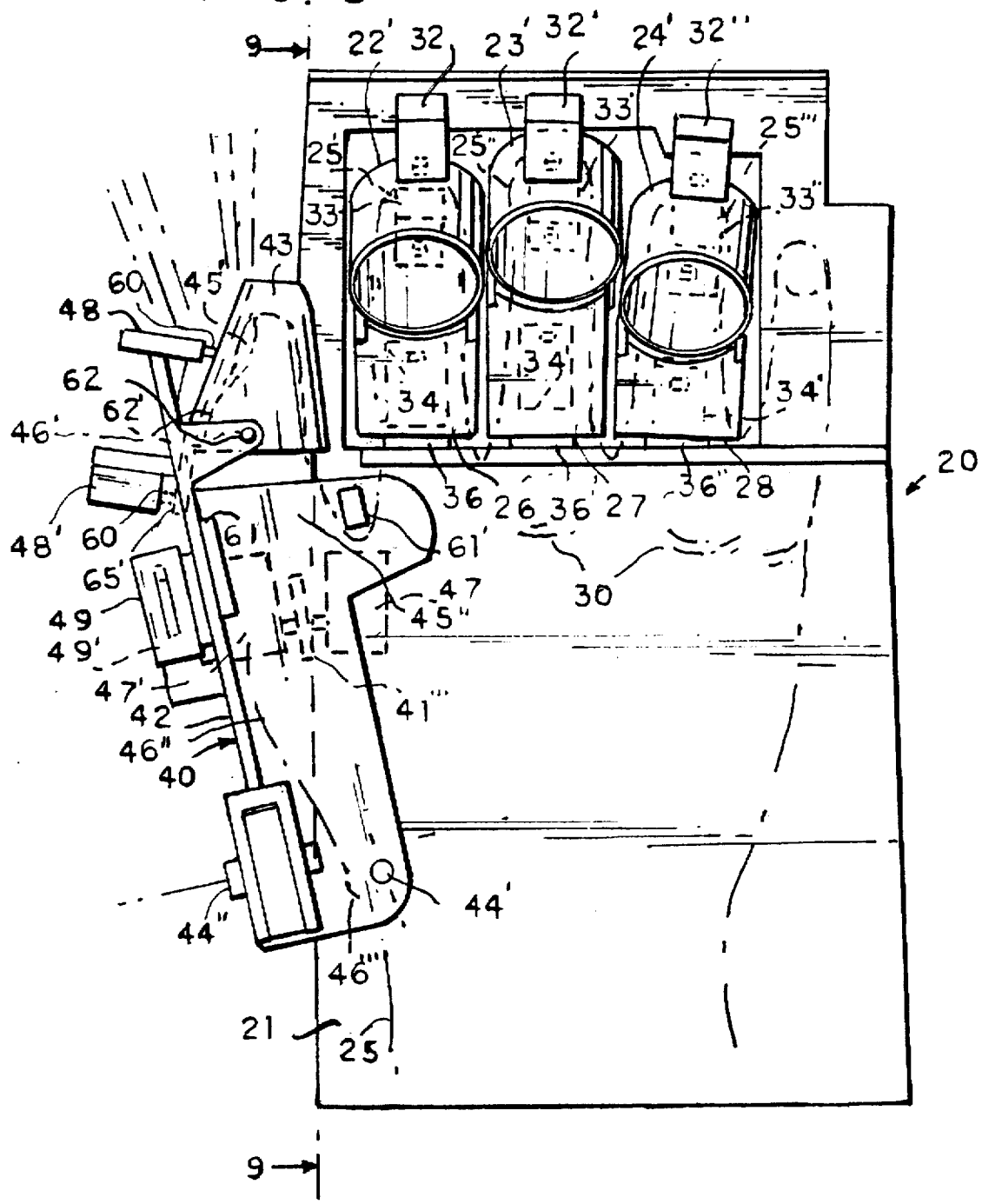
FIG. 8 is a top plan view of the finger and thumb keyboard.
Figure 9:
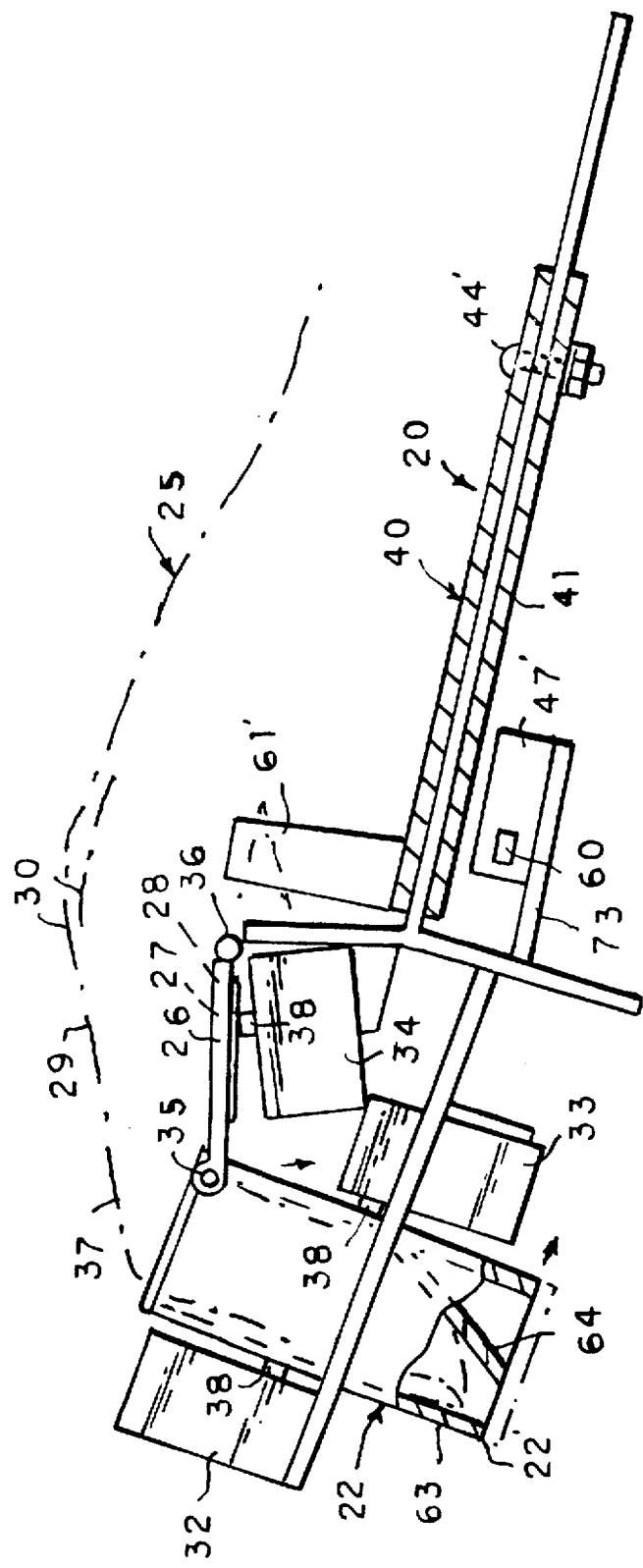
FIG. 9 is a cross-sectional view of the keyboard taken along line 9—9 of FIG. 8.

Two of the six switches 48 and 48' provide a forward left and right actuation switches for the forward tip 45' of the thumb to operate by the operator pivoting his thumb tip 45' either left or right, when viewed from FIG. 8, about his forward joint 46' to pivot the thumb sleeve 43 back and forth about the vertical axis of its pivotal mounting mounting on pins 42" of the thumb arm 42, which pivots the sleeve 43 horizontally against either button 60 of switch 48 or button 60 of of switch 48', which switches are also fixed to the thumb arm.

The switches 47 and 47' can be activated without the tip 45' of the thumb activating the switches 48 or 48', and visa versa. If only the tip switches 48 or 48' are to be activated, the operator needs only move the tip 45' of his thumb horizontally either left or right, which can be moved by the operator pivoting only the tip 45' of his thumb 45 about is forwardmost thumb joint 46'. This tip can be moved by the operator, without the operator moving the rear portion of his thumb about either his second thumb joint 46" or the rearwardmost thumb joint 46"' and without moving the rear main plate 41 relative to the palm rest, with the thumb sleeve pivoting back and forth about its pivotal connection to the flanges 62 of the thumb arm 42 on pins 62'.

Two of the switches 49 and 49' provide a vertical up and down switch actuation for the thumb. The rear main portion 45" of the thumb can be pivoted up and down about its rear joint 46"' of the thumb to the palm of the hand, with the tip 45' of the thumb, resting in the thumb sleeve 43, pivoting the thumb sleeve and thumb arm upward and downward about the pivotal connection of the thumb arm to the main plate 40 on the horizontal pivot 44". This up and down movement of the thumb arm relative to the plate 40 causes the flange 63, fixed to the thumb arm, to move up and down, when viewed from FIG. 7, relative to the plate 41 and engage either the button 60 of switch 49 or 49', which switches are fixed to the main plate, to activate either switch 49 or 49, by up or down movement, respectively.

The sleeve 43 has an elongated rod member 65 fixed to the rear edge 43' of the conical sleeve 43 and projects rearward of its rear open end 43". The thumb arm 42 has a slot 66 and the rear end 65' of rod 65 pivots in the slot 66 when the sleeve 43 is pivoted about its pin mounting to the arm 42, so that when the sleeve 43 is pivoted clockwise, when viewed from FIG. 8, the rod will pivot against the button 60 of switch 48' to activate switch 48'.

Switch 48 is activated by the thumb sleeve 43 being pivoted counterclockwise, when viewed from FIG. 8, by the tip 45" of the thumb being pivoted about the first joint 46, until the sleeve 43 engages against the button 60 of switch 48 to activate switch 48.

The switches 47 and 47' are fixed to the palm rest 21 by being fixed to a generally horizontal flange 73, which flange 73 is fixed to the palm rest 21. The buttons 60 of switches 47 and 47' confront one another; and the depending flange 41"', fixed to the main plate 41 projects horizontally between the buttons 60 of switches 47 and 47', so that pivoting the main plate 41 counterclockwise pivots the depending flange 41"' against button 60 of switch 47 to activate switch 47 and pivoting the main plate clockwise, when viewed from FIG. 8, pivots the depending flange 41"' against button 60 of switch 47' to activate switch 47".

Operation:

Movement of the Tip of the Thumb Horizontally to Move The Thumb Sleeve Horizontally Moving the tip 45' of the thumb 45 horizontally only about the front joint 46 either left or right when viewed from FIG. 8, will pivot the sleeve 43 horizontally either left or right to activate either switch 48 or 48', depending upon the direction of the movement, by the sleeve 43 or the rod 71 of the sleeve engaging either button 60 of switch 48 or 48'. All the switches of the apparatus including the six thubm switches will have the customary spring returns to return the buttons outward is released, such as when the thumb against the thumb sleeve, which in turn, is against the the button is removed. The switches chosen will have sufficient strength to return the thumb sleeve to its neutral position as shown in FIG. 8, when the pressure of the tip of the thumb horizontally against the sleeve in either direction is removed.

Moving the Rear Thumb Portion Horizontally to Move the Main Plate Horizontally

Moving the rear main portion 45" of the thumb, horizontally back and forth about the rear joint 46"' of the thumb, pivots the main plate 41 horizontally, either left or right when viewed from FIG. 8, about the rear pivot 44' of the main plate and activates either switch 47 or switch 47'. This can be accomplished by the rear portion 45" of the thumb engaging either upright flange 51 or 61' depending upon the direction of the horizontal movement. This part of the thumb engaging these flanges is to the rear of the tip 45' of the thumb and to the rear of the front joint 46' of the thumb. Pivoting this rear portion 45" of the thumb horizontally moves the plate 41 and the plate 41 carries the tip 45' and the rear portion 45" of the thumb thereon, and also carries the thumb arm 42 and sleeve 43 thereon, with the tip of the thumb riding in the sleeve 43.

The switches 48 and 48' for the tip of the thumb also also fixed on and carried on the thumb arm 42, and they and the arm are carried with the main plate in its movement horizontally. Consequently, the tip 45' of the thumb may be pivoted horizontally to pivot the thumb sleeve back and forth horizontally to engage the actuation button 60 of either switch 48 or 48', without moving the rear thumb portion 45" and without the movement of the rear plate portion 41 acting to interfere with or acting to actuate either switch 48 or 48' for the tip of the thumb.

Moving the Tip of The Thumb Vertically to Move the Thumb Sleeve Vertically to Thereby Move the Thumb Arm Vertically Moving the tip 45' of the thumb 45 vertically up and down the rear joint 46" of the thumb moves the thumb sleeve 43 vertically which thereby pivots the thumb arm 42 vertically on the main plate 41 about pivot 44". The movement either up or down activates either switch 49 or 49' depending upon whether the movement is either up or down. This can be accomplished without the operator pivoting the tip 45' of his thumb 45 horizontally about the forward joint 46' of the thumb. Consequently, this vertical ovement of the thumb, when viewed from FIG. 7, willl activate only the switches 49 and 49 fixed on the main plate 41.

Thus, six different switch actuation movements are provided by the thumb assembly 40 for the thumb 45. One or more of these six switches may be used to switch the format of the 26 different key switch actuations provided by the three finger sleeve assembies 22, 23, and 24 to some other formats since the three finger sleeve assemblies may be operated by the three fingers of the operator's hand in the finger sleeves, while the thumb assembly may be operated by the thumb of the same hand in the thumb receptacle 43.

The tips or outer ends 63 of the finger sleeves 22', 23', and 24' have conical or tapered ends along their inner surfaces to receive in general compelementary relation the tips of the fingers as they also reduce or taper together toward their outermost ends. This construction reduces loose movement of the tips of the fingers about their middle joints 37, so that very little movement of the tips of the fingers, either forward or back, will immediately move their respective sleeves forward and back a corresponding distance. The fronts 64 of the sleeves will have a straight cylindrical inner surface to correspond to or complement generally cylindrical front outer surface of the fingers. The slanted back panel 64 will taper up, outward toward the pivotal mounting 35 of the sleeves to the inner half sleeve members 26-28. The tapered back panel angle provides a better gripping surface for the bottom of the fingers to frictionally grip or engage to better move the sleeves downward, when pivoting the half sleeves downward by the inner finger portions; and to facilitate thereby moving the sleeves downward and the half sleeves downward by the movement of the fingers downward about the inner joints 30, 30', 30".

It will be obvious that various changes and departures may be made to the invention without departing from the spirit and scope thereof, and accordingly, it is not intended that the invention be limited to that specifically described in the specification or as illustrated in the drawings, but only as set forth in the appended claims wehrein:

What is claimed is:

1. A keyboard for an operator's hand comprising a rigid framework, a finger receptacle device mounted on said framework, said receptacle device having a plurality of elongated finger receiving receptacles laterally beside one another and extendable in length laterally forward and at least somewhat downward and each having an open upper rear end to receive a forward end portion of a finger, a finger engagement panel aligned longitudinally rearward of the upper open end of each receptacle with said receptacle pivotally mounted at its upper rear end to said engagement panel at its forward end to form an intermediate pivotal connection, each receptacle upper rear end adapted to receive a forward end portion of a finger of the operator's hand also adapted to be pivoted laterally of its length to and fro longitudinally about its pivotal rear upper end intermediate connection when the front end portion of the finger is pivoted similarly to and fro laterally of its length about its pivotal joint intermediate its length in a first finger movement;

said finger engagement panel longitudinally aligned rearward of each receptacle being open along its top to receive the rearward portions of the finger and is pivotally mounted at its rearward end to the framework to pivot downward about its pivotal mounting when said finger is similarly pivoted downward about its rear joint connection to the palm of the operator's hand together with or independently of any first finger movement;

first switches mounted on said framework along the exterior and in the path of at least one of the to and fro longitudinal pivotal movements of the receptacle and each having spring urged actuation means urging said receptacles laterally of their length longitudinally away, and actuatable by said receptacle movement by said finger toward and into engagement with the actuation means by said first finger movement;

a second switch on said framework below said panel means an each having spring biased actuation means to urge the panel means upward to a neutral position with said second switch actuatable by said panel means downward engagement with said actuation means upon said second finger movement down onto said panel means to actuate said second switch, said second switch being maintainable selectively actuated by the downward movement of the finger about its rear joint and maintaining it there; while together therewith, the first switches are selectively actuated by the movement of the finger receptacles by the ends of the fingers pivoting about their intermediate joints to enable the first and second switches to be selectively distinguished so as to be actuated together or separately of one another with the same finger in two different finger movements.

2. A keyboard comprising a framework, a elongated finger receiving device having a rear finger portion and a forward finger portion with the forward portion adjacent the rear portion at an intermediate location relative to its length, said forward portion being inclined downward at its forward most end relative to the rear portion from its intermediate location adjacent the rear portion, said rear portion being movably mounted on said framework to move downward, said forward portion being movably mounted relative to said rearward portion to move to and forward along the length of the receiving device, said forward portion being adapted to receive the forward outer end of a finger of an operator's hand, said rear portion being adapted to receive the rear portion of said same finger, said forward and rear portions being adapted to receive the finger with the intermediate joint of the finger adjacent the intermediate location between the front and rear portions and with said front and rear portions adapted to move independently of one another, switch means with switch actuation for said forward portion and responsive to movement of said forward portion in at least one direction longitudinally by said forward portion of the finger, switch means with switch actuation for said rear portion and responsive to the movement of the rear portion longitudinally downward by the movement of the rear portion of the finger for selectively actuating the switches.

3. A keyboard for an operator's hand comprising a rigid framework, a finger recptacle device mounted on said framework, said receptacle device having a plurality of finger receiving receptacles extending forward and downward and each having an open upper end, said receptacles being movably mounted on said framework to move forward an rearward, said receptacle device including a second finger engagement means movably mounted on said framework to move downward, said receptacle and finger engagement means being adapted to receive a finger of the operator's hand with the outer end of the finger in the open end of the receptacle, said receptacle adapted to being movable forward and rearward by said finger and said engagement means being adapted to be movable downward relative to the framework by the same finger, said framework having a first switch means mounted at least to the rear of the receptacle with spring urged actuation means on said first switch means engagable by the receptacle upon its rearward movement to actuate the first switch means when said finger is pivoted about its joint intermediate its length;

a second switch means for engagement by said second finger engagement means in its downward movement and having upward urged spring actuation means engagable by said downward engagement means for actuation of said second switch means, said receptacle rearward actuation means and said downward engagement means movement being selectively separate or simultaneously together with one another by said same finger.

4. A keyboard according to claim 3, wherein said receptacles are elongated and have a lateral width at least approaching the width of the operator's finger and an inside diameter greater than the outside diameter of the operator's finger, and said finger engagement panels also have a lateral width at least approaching the lateral width off the rear portions of the operator's fingers near the palm.

5. A keyboard according to claim 3, wherein said receptacles are elongated and are forward of said second finger engagement panels and extend in length laterally forward and downward, and said movable mounting of said receptacles comprises a pivotal mounting at the upper end of said receptacle to the forward end of said engagement panels.

6. A keyboard according to claim 3 wherein said engagement panels are pivotally mounted at their rearward ends to the framework, and said second switches are mounted on said framework to urge said panels upward.

7. A keyboard according to claim 3 wherein said receptacles may slide axially downward between said front and rear first switches, during the activation of the second switch means during the downward movement, without activating either switch, when the panels means is pivoted downward by the engagement of the rear portions of the finger thereto, unless the receptacle is pivoted either forward or rearward by the operator's finger, and said first switches may be activated by said forward or rearward movement of the receptacle regardless of whether the panel is in its upward neutral position or downward activated position.

8. A keyboard comprising a rigid framework, a hand receptacle device for the fingers and thumb of an operator's hand including finger and thumb receptacles movably mounted on said framework, first switches mounted on said framework adjacent said finger and thumb receptacles and having actuation means actuatable by said movement of said finger and thumb receptacles onto said actuation means, said receptacles having openings adapted to receive end portions of said fingers and thumb of the operator' hand therein and to be moved by the ends of the fingers and thumb for said receptacles to engage and actuate said actuation means.

9. A keyboard according to claim 8 wherein said receptacle device includes rear finger engagement means and rear thumb engagement means movably mounted on said framework, second switch means are adjacent the rear finger and rear thumb engagement means and have second actuation means actuated by the movement of said rear finger and thumb engagement means resulting from the movement of said rear finger and rear thumb movement into engagement with said actuation means, with said rear finger and rear thumb engagement means being open to receive rear portions of the finger and thumb, whereby the first and second switches may be activated selectively of one another and thereby operate as a keyboard.

10. A keyboard according to claim 8 wherein said receptacles and rear engagement means of the fingers and thumb are adapted to enable the ends of the fingers and thumb to remain in their receptacles for actuation of their first switches while said rear engagement means and thumb engagement means may be actuated by the rear finger portions and rear thumb joint movement of the operators hand.

11. A keyboard according to claim 8 wherein said receptacles are open along the top and said engagement means are open along their upper portions to receive the ends of the fingers into the receptacles and the rear portions of the fingers onto the engagement means.

12. A keyboard according to claim 2 wherein said outer switches mounted on said rigid framework adjacent said finger receptacles are also forward of the path of the finger receptacles so as to be actuated selectively by said finger receptacles when moved forward by the finger of the operator's hand.

13. A keyboard according to claim 2, wherein said second finger actuation member is adjacent each finger receptacle, and said second inner switch includes a switch adjacent each finger actuation switch and wherein the movement of each finger for each receptacle about its rear joint selectively moves said second finger actuation member to actuate its second inner switch.

14. A keyboard according to claim 2, wherein said palm rest has mounted adjacent one lateral side of said rest a lateral thumb receptacle for receiving at least the tip of the thumb of the operator's hand, and said thumb receptacle is laterally beside said finger receptacles, a thumb receptacle lifting arm and a thumb receptacle carrying plate are mounted on said palm rest with said thumb carrying plate pivotally mounted to said palm rest to pivot about a vertical axis and said thumb receptacle lifting arm is pivotally mounted to said carrying plate to pivot about a horizontal axis, with said receptacle being movably mounted to move either left or right on said lifting arm in response to the tip of the thumb pivoting either left or right about its joint intermediate its length, thumb tip switch means mounted adjacent each lateral side of said thumb receptacle, whereby movement of the thumb receptacle either to the left right actuates selectively either the left or right tip switch.

15. A keyboard according to claim 2, wherein said palm rest has a thumb receptacle movably mounted to move either to the left or right along one lateral side of the palm rest and adapted to receive the tip of the operator's thumb therein whereby movement of the thumb left or right about its intermediate joint will move the thumb receptacle either left or right, thumb switch means, thumb carrying plate, and switch means on each side of said thumb carrying plate whereby when the operator moves his thumb about its rear joint laterally to either the left or right, its movement will move the thumb carrying plat either to the left or right to selectively actuate either thumb carrying switch, an said thumb carrying plate has switch means either to the left or right of said thumb receptacle, whereby the operator's movement of the tip of his thumb either to the left or right with his thumb therein will move the thumb receptacle either to the left or right to selectively actuate either thumb tip switch means.

16. A keyboard according to claim 2, wherein said thumb receptacle is also pivotally mounted to an arm which in turn is pivotally mounted to said carrying plate to pivot up and down on said thumb carrying plate when the operator pivots his thumb upward and downward about its rear joint, a third switch means mounted on said thumb carrying plate above and below said arm whereby when the operator moves his thumb upward and downward about its rear joint of the operator's hand.

17. A keyboard comprising a framework, a thumb carrying plate movably mounted on said framework to carry a thumb of an operator's hand thereon, a thumb receptacle at the forward end of said plate to receive the forward outer end of the thumb, said receptacle being movable laterally back and forth on said carrying plate when said thumb is moved laterally back and forth by the operator, switch means in the path of movement of the receptacle actuatable by the engagement of the receptacle to the switch means.

18. A keyboard according to claim 17 wherein said thumb receptacle movable mounting to the thumb carrying plate comprises a pivotal mounting at the forward portion of the carrying plate adapted to be about an axis perpendicular to framework with said framework adapted to be in the plane of the palm of the operator's hand, and with said pivotal mounting adapted to be adjacent the forward pivotal joint of the thumb, said carrying plated movable mounting to the frame comprising a oivotal along an axis parallel to the plane of the framework to the rear of the thumb receptacle pivotal mounting and adapted to be adjacent the rear joint of the thumb where the thumb is connected to the palm.

* * * * *